(No Model.)
A. STRAUS.
PNEUMATIC TIRE FOR VEHICLES.
No. 548,674. Patented Oct. 29, 1895.
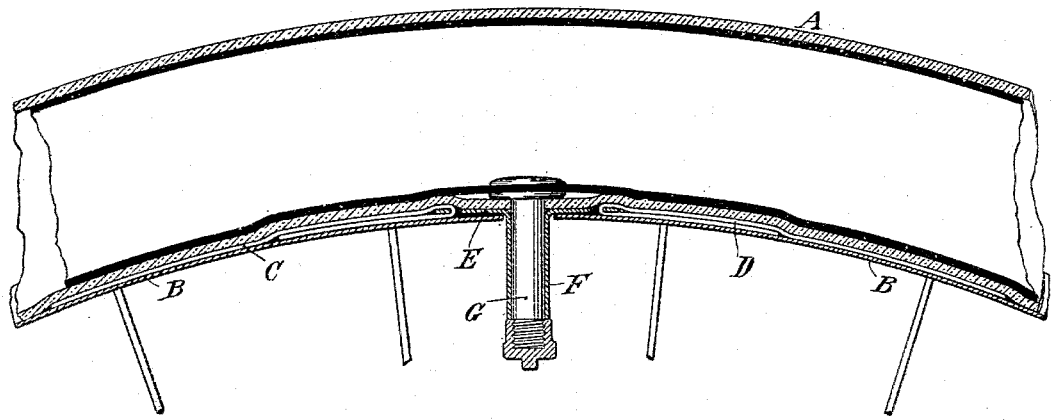
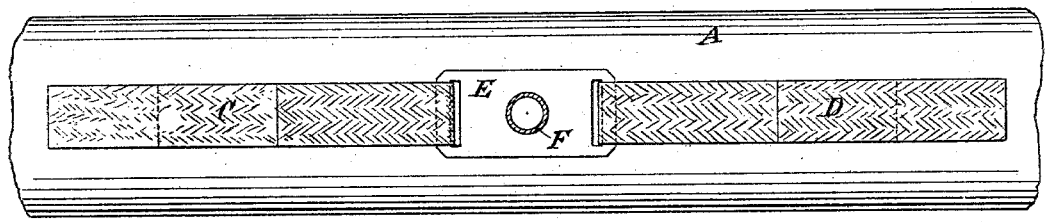
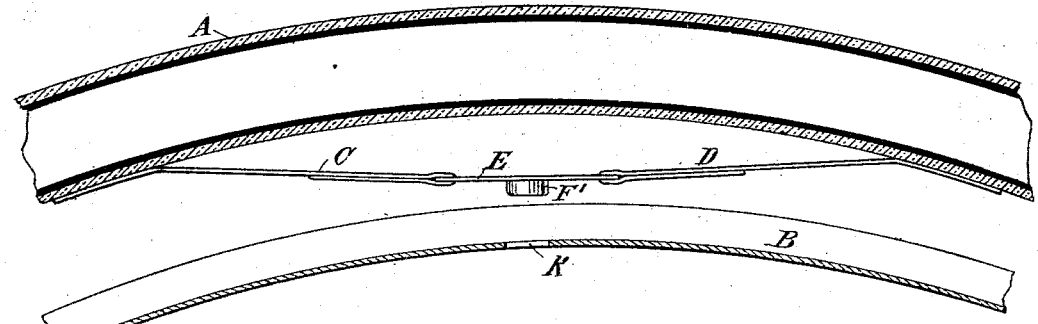
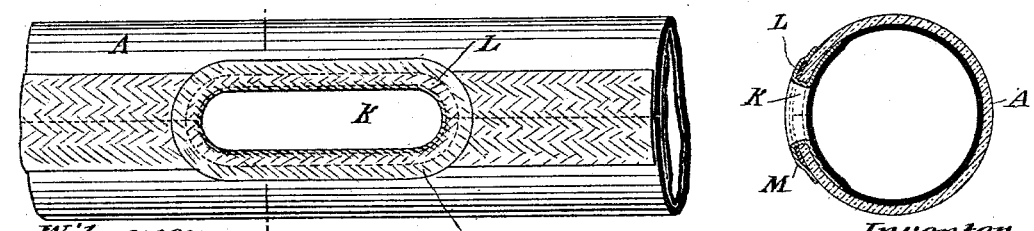
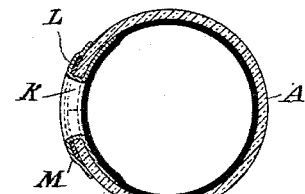
Witnesses:
Raphaël Netter
James M. Catlow
Inventor
Alexander Straus
by Duncan & Page
Att'ys.

UNITED STATES PATENT OFFICE.

ALEXANDER STRAUS, OF NEW YORK, N. Y.

PNEUMATIC TIRE FOR VEHICLES.

SPECIFICATION forming part of Letters Patent No. 548,674, dated October 29, 1895.

Application filed May 2, 1895. Serial No. 547,844. (No model.)

*To all whom it may concern:*

Be it known that I, ALEXANDER STRAUS, a citizen of the United States, residing at New York, in the county and State of New York, have invented certain new and useful Improvements in Pneumatic Tires for Vehicles, of which the following is a specification, reference being had to the drawings accompanying and forming a part of the same.

This invention is an improvement in pneumatic tires for vehicles, more particularly cycles, and is in its more important features applicable either to tires of the hose-pipe or single-tube type, or to those which comprise an inner separate or separable air-tube and an outer jacket or sheath in tubular form.

The prior state of the art, in so far as it directly bears upon the special features of novelty which distinguish my present invention, is, as I understand the matter, substantially this: Pneumatic tires when made in tubular form exhibit, under ordinary conditions of use a tendency to "creep" or move circumferentially in their rims. This tendency has been overcome by cementing or securing the tires to the rims or by providing projections either integral with or independently formed and secured to the tires, which projections enter corresponding recesses or perforations in the rims and by their engagement therewith lock the tires against circumferential movement.

In carrying out my invention I provide for a positive engagement of the tire and rim which will prevent creeping; but in lieu of forming the projections on the tire or securing a rigid piece or pieces directly thereto I attach said pieces to the tire by a flexible strap or straps.

I have illustrated the improvements in the accompanying drawings in the best and most practicable form of which I am at present aware.

Figure 1 is a longitudinal central section of the part of a tire near the valve and which is constructed in accordance with my invention. Fig. 2 is a plan view of the portion of tire in Fig. 1, exhibiting the inner or under surface of the same. Fig. 3 is a longitudinal central section of another portion of the tire and rim. Fig. 4 is a plan view of a portion of the inner or under surface of the tire, showing an opening therein. Fig. 5 is a cross-section on line *x x* of Fig. 4.

Let A designate a tubular sheath or tire of any proper materials and construction, and B an exteriorly-grooved rim in which the tire is seated. As all of such tires which are to be inflated require a valve, and as the valve-stem usually extends inwardly through the rim, any tendency of the tire to creep circumferentially in the rim results in wear upon or cutting of the valve-stem. If the tire be cemented in the rim, this creeping is prevented, but the removal of the tire for any purpose becomes difficult, and cementing generally is moreover objectionable. The means which I have devised accomplishes the same purpose in a very simple manner.

To the inner or under surface of the sheath or tire—that is to say, the part which is inclosed by the rim—I attach, as by cement or by vulcanization, the ends of two straps or bands C D of flexible material, usually stout tapes or strips of fabric. The free ends of these straps are secured to a metal plate E, having a tubular projection F, through which the valve-stem G extends. When the tire is seated in the rim, the projection F passes through the valve-hole in the rim, where it not only serves to protect the valve-stem, but to prevent any circumferential creeping of the tire in either direction at that point.

It will be noted that for a short distance on either side of the projection F, as indicated in Fig. 3, the bands or straps C D should not be attached to the tire, so that the latter may be entirely free to move laterally, except as it may be prevented by its shape under the pressure of the air within.

It should also be observed, since the tendency to creep is always in one direction, that only that one of the straps C D which resists such tendency is actually required, but two should be used as a matter of precaution against the tire or wheel being turned the wrong way by inexperienced or careless persons.

The particular character of the projection F by which it is made to serve a twofold purpose is not essential, as one or more similar devices may be applied or attached to the tire at other and different points. In case the projection is not associated with the valve-stem, however, it is of different form, as shown in Fig. 3, where the plate E is provided with a simple lug F', which extends through a perforation or it may be a recess in the rim B.

At one or more points in the inner or rim-covered portion of the tire are openings K, the edges of which are reinforced by steel rings L, secured to the said edges by canvas strips M, cemented and usually vulcanized over the same. These openings are of such width as to be wholly covered by the rim when the tire is inflated, but are of such length as to readily permit the inner tube to be withdrawn partially or wholly through them when access to the tube, as for purposes of repair, is desired.

A tire thus constructed is as securely held in position in its rim as if cemented, the projections F or F' serving to prevent circumferential movement, while the rigidity of the tire itself under inflation holds it firmly against lateral displacement.

I do not wish to limit myself to any special form of the device F or F', nor to any special means of attaching these to the strap or straps, nor to any special manner of attaching the said straps to the tire, the essential feature of the improvement in this respect being the provision of a device to positively engage with the rim and which is attached to the tire by a flexible connection in substantially the manner illustrated.

I am aware that wires or bands passing through pockets in pneumatic tires and encircling the rims of the wheels to which said tires are applied have been caused to engage positively with such rims. These devices, however, have a different purpose from the bands or straps which I employ, in that in my improvement such bands or straps have no function as a means for binding or clamping the tires to the rims, but merely to prevent circumferential movement of the tires in their rims.

What I claim is—

1. The combination with a pneumatic or inflatable tire of the hose-pipe or tubular form, of one or more flexible straps or bands attached exteriorly to the same and provided with devices for positively engaging with a rim and preventing circumferential movement or creeping of the tire therein.

2. The combination with a pneumatic or inflatable tire of the hose-pipe or tubular form, of one or more rigid projections adapted to enter perforations or recesses in a rim, and flexible straps or bands attached exteriorly to the under side of the tire and to said projections, as and for the purposes set forth.

3. The combination with a pneumatic or inflatable tire of the hose-pipe or tubular form, of one or more rigid projections adapted to enter perforations or recesses in a rim and flexible straps or bands, the ends of which are respectively attached or secured exteriorly to the under surface of the tire and to the said projection.

4. The combination with a pneumatic or inflatable tire, of one or more metal plates formed or provided with projections adapted to pass through perforations in a rim, and flexible straps or bands secured to the inner or under surface of the tire and to the ends of said plates, as set forth.

5. The combination with a pneumatic or inflatable tire provided with a valve stem, of a plate having a hollow stud or projection thereon adapted to pass through the valve hole in the rim and surrounding the valve stem, and one or more flexible straps secured to the inner or under side of the tire and to the said plate, as set forth.

In testimony whereof I have hereunto set my hand this 26th day of April, 1895.

ALEXANDER STRAUS.

Witnesses:
ROBT. F. GAYLORD,
JAMES N. CATLOW.